United States Patent [19]
Chen et al.

[11] Patent Number: 5,780,175
[45] Date of Patent: Jul. 14, 1998

[54] ARTICLES COMPRISING MAGNETICALLY SOFT THIN FILMS AND METHODS FOR MAKING SUCH ARTICLES

[75] Inventors: Li-Han Chen; Sungho Jin. both of Millington; Wei Zhu. Middlesex; Robert Bruce van Dover. Maplewood. all of N.J.

[73] Assignee: Lucent Technologies Inc., Murray Hill, N.J.

[21] Appl. No.: 595,543

[22] Filed: Feb. 2, 1996

[51] Int. Cl.$^6$ .......................... H01F 10/14; H01F 10/10
[52] U.S. Cl. .......................... 428/692; 428/694 T
[58] Field of Search .......................... 428/694 T, 692, 428/611

[56] References Cited

U.S. PATENT DOCUMENTS

| | | | |
|---|---|---|---|
| 4,835,069 | 5/1989 | Sawada et al. | 428/694 T |
| 5,382,305 | 1/1995 | Terunuma et al. | 428/692 X |

FOREIGN PATENT DOCUMENTS

| | | | |
|---|---|---|---|
| 36-3253524 | 10/1988 | Japan | 428/694 T |
| 40-6223355 | 8/1994 | Japan | 428/694 T |

OTHER PUBLICATIONS

Patent Abstracts of Japan, vol. 095, No. 008, 29 Sep., 1995 & JP 07 130538 A (Hitachi Metals Ltd), published 19 May, 1995, Int. Class H01F 10/14; C23C 14/06; G11B 5/127; G11B 5/31. Abstract attached.
Patent Abstracts of Japan, vol. 095, No. 008, 29 Sep., 1995 & JP 07 122428 A (Matsushita Electric Ind Co Ltd), published 12 May, 1995. Int. Class: H01F 10/16; C23C 14/06; G11B 5/127; G11B 5/31. Abstract attached.
U.S. Patent 5,421,915, Nakanishi et al. filed May 5, 1992, issued Jun. 6, 1995. U.S. Class 148/304; 148/306; Int. Class: H01F 1/147. Copy attached.
Noriyuki Kataoka, Masami Hosokawa, Akihisa Inoue, and Tsuyoshi Masumoto, "Magnetic Properties of Fe–Based Binary Crystalline Alloys Produced by Vapor Quenching", *Japanese Journal of Applied Physics*, vol. 28, No. 3 Mar. 1989, pp. L462–L464.
Kiyohito Yamasawa, Member, IEEE, Kenji Maruyama, Isao Hirohama, and Paul P. Biringer, Fellow, IEEE, "High–Frequency Operation of a Planar–Type Microtransformer and Its Application to Multilayered Switching Regulators", *IEEE Transactions on Magnetics*, vol. 26, No. 3, May 1990, pp. 1204–1209.
G. Qiu, E. Haftek, and J. A. Barnard, "Magnetic properties and crystal structure of high moment FeTaN materials for thin–film recording heads," *J. Appl. Phys.* 73 (10), 15 May 1993, pp. 6573–6575.
Nobuyuki Ishiwata, Chizuko Wakabayashi, and Haruo Urai, "Soft magnetism of high–nitrogen–concentration FeTaN films," *J. Appl. Phy.* 69 (8), 15 Apr. 1991, pp. 5616–5618.

Primary Examiner—Daniel Zirker
Attorney, Agent, or Firm—John M. Harman

[57] ABSTRACT

The invention is embodied in a soft magnetic thin film article comprising an iron-chromium-nitrogen (Fe—Cr—N) based alloy and methods for making such article. The soft magnetic thin film article is formed using an iron-chromium-nitrogen based alloy with tantalum in one embodiment and with at least one of the elements titanium (Ti), zirconium (Zr), hafnium (Hf), vanadium (V), molybdenum (Mo), niobium (Nb) or tungsten (W) in another embodiment. The article is formed such that the alloy has a relatively high saturation magnetization (e.g., greater than approximately 15 kG) and a relatively low coercivity (e.g., less than approximately 2.0 oersteds) in an as-deposited condition or, alternatively, with a very low temperature treatment (e.g., below approximately 150° C). The inventive films are suitable for use in electromagnetic devices, for example, in microtransformer cores, inductor cores and in magnetic read-write heads.

8 Claims, 5 Drawing Sheets

PRIMARY ———
SECONDARY ≡≡≡≡

ARTICLES COMPRISING MAGNETICALLY SOFT THIN FILMS AND METHODS FOR MAKING SUCH ARTICLES

BACKGROUND OF THE INVENTION

1. Field of the Invention

The invention relates to thin films of magnetically soft alloys. More particularly, the invention relates to articles comprising these alloys and methods for making such articles.

2. Description of the Related Art

Soft magnetic thin films are useful in modern, high-frequency, electromagnetic devices as a field-amplifying component, e.g., in the read-write head for magnetic disk memories in computers or as a core in microtransformers and inductors. Among the desired properties of these films are relatively high saturation magnetization ($4\pi M_s$), low coercivity ($H_c$), high permeability, high electrical resistivity and corrosion resistance. Various applications of soft magnetic thin films are described, for example, in books *Magnetic Thin Films* by R. F. Soohoo, Harper and Row, 1965; *Thin Ferromagnetic Films* by M. Prutton, Butterworth, 1964; and in articles C. R. Sullivan and S. R. Sanders, IEEE Trans. on Power Electronics, Proc. 24th Annual Power Electronics Specialists Conf., p. 33–40, Jun. 1993; and T. Yachi et al., IEEE Trans. Magn. 28, 1969–1973 (1992).

Among the known soft magnetic thin films, nickel-iron (Ni—Fe) based films such as 80% Ni-20% Fe (permalloy) are used most widely because of excellent magnetic properties and zero magnetostriction characteristics. Fe-based films such as iron-tantalum (Fe—Ta), iron-zirconium (Fe—Zr) and iron-hafnium (Fe—Hf) alloys generally exhibit higher saturation magnetization of 15–20 kilogauss (kG) as compared to about 10 kG for the 80% Ni permalloy films (see, e.g., N. Kataoka et al., Japanese J. Appl. Phys. 28, L462–L464, 1989, Trans. Jap. Inst. Metals 31, 429, 1990), however, they exhibit poorer soft magnetic properties and require post-deposition heat treatment.

To obtain improved soft magnetic properties, nitrogen-containing films of these Fe-based alloys such as iron-tantalum-nitrogen (Fe—Ta—N) have been prepared. See, for example, E. Haftek et al., IEEE Trans. Magn. 30, 3915–3917 (1994); N. Ishiwata et al., J. Appl. Phys. 69, 5616 (1991); J. Lin et al., IEEE Trans. Magn. 30, 3912–3914 (1994); and G. Qiu et al., J. Appl. Phys. 73, 6573 (1993). However, although desirable magnetic softness with a coercivity, $H_c$, of less than approximately 2 oersted (Oe), which is desirable for microtransformer applications, is obtainable in these nitrogen-containing films, it is apparent from the aforementioned articles that such desirable soft magnetic properties are difficult to obtain in the as-deposited films, but are possible after post-deposition heat treatment at high temperatures.

However, such heat treatment of deposited films is an additional processing step that needs to be avoided if possible, not only from the manufacturing cost point of view but also because of the complications of having to expose to high temperature various other components and materials in the devices. As a result of high temperature exposure, some of these components can be damaged, e.g., decomposition of polymers or polyimide insulating films, diffusion-induced chemical changes or damages, stress problems caused by thermal expansion mismatch of different materials.

Therefore, it is desirable for the required soft magnetic properties in the films to be obtained in the as-deposited condition, or at the worst, with a very low temperature heat treatment below approximately 150° C. where damage to polymers such as polyimide is kept relatively low. This application discloses new soft magnetic films with such desirable characteristics. Also, it is desirable to improve the corrosion/oxidation resistance of the Fe-rich thin films, as the oxides of iron and iron-rich alloys generally exhibit substantially reduced magnetic saturation. This application discloses thin films with improved corrosion resistance.

SUMMARY OF THE INVENTION

The invention is embodied in a soft magnetic thin film article and methods for making such article. In particular, it is a soft magnetic thin film article comprising an iron-chromium-nitrogen (Fe—Cr—N) based alloy with tantalum in one embodiment and formed with at least one of the elements titanium (Ti), zirconium (Zr), hafnium (Hf), vanadium (V), molybdenum (Mo), niobium (Nb) or tungsten (W) in another embodiment. The article is formed such that the alloy has a relatively high saturation magnetization (e.g., greater than approximately 15 kG) and a relatively low coercivity (e.g., less than approximately 2.0 oersteds) in an as-deposited condition or, alternatively, with a very low temperature treatment (e.g., below approximately 150° C). The inventive films are suitable for use in electromagnetic devices, for example, in microtransformer cores, inductor cores and in magnetic read-write heads.

It is to be understood that the drawings are to illustrate the concepts of the invention and are not to scale.

DETAILED DESCRIPTION

Figure 1:
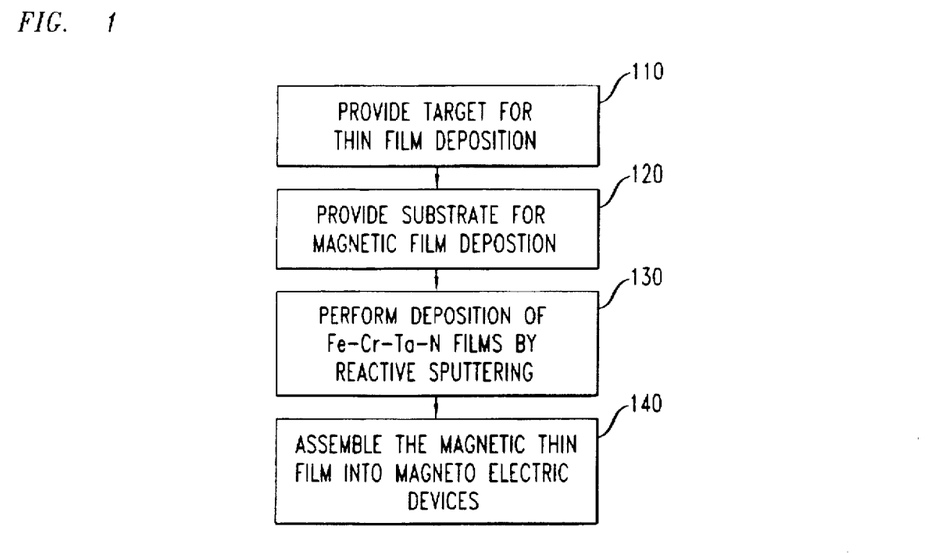
FIG. 1 is a block diagram showing one method for making the Fe—Cr—N based soft magnetic thin films according to the invention.

Referring to the drawings, FIG. 1 is a block diagram showing one of the methods for making the Fe—Cr—N based soft magnetic thin films in accordance with the invention (i.e., soft magnetic thin films comprising Fe, Cr, N and either Ta or at least one of the following elements: Ti, Zr, Hf, V, Mo, Nb or W). A first step 110 is to provide an alloy target or targets from which the magnetic thin films of the invention are to be deposited, e.g., via chemical deposition or via physical deposition such as sputtering, evaporation, molecular beam epitaxial growth, ion beam deposition and laser ablation.

For example, deposition by sputtering is amenable to large-scale industrial manufacturing. The sputtering target (shown as 210 in FIG. 2a), which is typically in the form of a round plate, has, in one embodiment, the alloy composition similar to the desired film composition and has, in another embodiment, composite sections of different metals or alloys on the target surface to be sputtered away. Alternatively, the film deposition is accomplished by using multiple targets, e.g., by co-sputtering from two or more targets with different composition chosen so that the final composition of the deposited film 250 on the substrate corresponds to the desired composition. For example, in data shown in FIGS. 3 and 4, co-sputtering with two targets (e.g., a Fe-5.3% Cr target on one side and a Ta or Hf target on the other side separated by approximately 6 inches) was utilized.

In another embodiment, diode sputtering or triode sputtering is used for deposition of the inventive films. Of these, triode sputtering generally is preferred because it uses lower bias voltage and lower Ar pressure, thus allowing easier control of the sputter deposition and the formation of desired nanocrystalline microstructure in the inventive Fe—Cr—N based soft magnetic films.

In an embodiment of the present invention, nitrogen is incorporated into the alloy film by reactive deposition, i.e., by continuously supplying a specific partial pressure of nitrogen gas in the background Ar gas carrier during the sputtering process. We currently believe that the nitrogen atoms go into the thin film structure both by reaction with one or more of the metallic elements in the form of nitride, such as Cr-nitride, Fe-nitride, and/or Ta-nitride or a nitride of the remaining element Ti, Zr, Hf, V, Mo, Nb or W, and by dissolution in the form of interstitial solute atoms in the alloy crystal lattice. In another embodiment, instead of reactive sputtering, nitrogen is supplied by alloying it directly into the sputtering targets. Alternatively, nitrogen is added to the films after deposition, e.g., by ion implantation. In this manner, thin films of inventive alloys, prepared by any suitable technique, are subjected to nitrogen implantation with appropriate doses and processing temperatures.

In the case of using a single alloy target for sputtering, the desired composition of the target for the inventive film deposition is: Fe balance, Cr in the range of approximately 0.5–20.0 atomic %, preferably 1.0–12.0% and even more preferably 2.0–8.0 atomic %, and the remaining element in the range of approximately 0.1–10.0 atomic %, preferably 0.1–5.0%, and even more preferably 0.1–3.0%. In one embodiment, the remaining element comprises Ta; in another embodiment, the remaining element comprises one or more elements chosen from Ti, Zr, Hf, V, Mo, Nb and W. If the nitrogen atoms are incorporated in the target, the desired composition is 1.0–30.0 atomic %, preferably 2.0–20.0%, even more preferably 2.0–15.0%. If nitrogen is to be added by reactive sputtering, the alloy target has 0.0–20.0% nitrogen depending on the concentration of the nitrogen gas used during the sputtering.

The next step 120 is to provide a substrate onto which the inventive magnetic film is to be deposited. A clean and smooth non-magnetic substrate surface is desired for microtransformer-type applications. Desirable substrate materials include, e.g., semiconductors such as silicon (Si) and gallium-arsenide (Ga—As), and other materials such as glass, quartz, ceramics, polymers and polyimide. A silicon substrate is convenient if other semiconductor electronic IC circuitry and interconnection features are to be integrated on portions of the same substrate. The IC circuits may be fabricated either before or after the deposition of the magnetic films.

In the case of microtransformer or inductor applications, especially for high frequency devices (e.g., f=1–1000 MHz), the inventive Fe—Cr—N based thin films are formed, in one embodiment, into a multilayer, patterned configuration with dielectric spacer layers, such as spin-coated or spray-coated and optionally photolithographically patterned polyimide films, interleaved therebetween. This multilayer configuration of magnetic thin films is desirable to provide high electrical resistance for each film layer so as to minimize eddy current loss on high frequency operation.

In this multilayer arrangement, more than one substrate material is involved, e.g., the first substrate is Si and then after the deposition of the first Fe—Cr—N based magnetic layer and polyimide insulation layer, the polyimide becomes the next substrate for the remaining layers of magnetic materials. As the magnetic properties of alloys and compounds are influenced often by crystallographic texture and lattice parameters, the substrate material is chosen, if desired, to provide epitaxial growth with accompanying lattice parameter modifications, to induce growth texture (such as a columnar structure), or to induce desired degrees of crystallization.

The next step 130 is to perform a deposition of Fe—Cr—N based thin films, e.g., by reactive sputtering in a nitrogen-containing atmosphere. The desirable amount of nitrogen is in the range of 0.2–30.0% in volume in argon (Ar) and preferably 0.5–10.0% in volume with a total (Ar+N$_2$) gas pressure of $10^{-2}$ to $10^{-4}$ Torr. The sputtering target(s) are desirably subjected to a bias voltage in the range of approximately 20–500 volts, preferably 50–200 volts.

For microtransformer or inductor applications involving multilayer deposition and temperature-sensitive dielectric spacer layers such as polyimide, the substrate temperature is kept preferably at or near ambient temperature. Alternatively, the substrate temperature is kept below approximately 150° C. (above which many polymers or polyimide begin to get damaged with undesirable chemical or structural changes). For other device applications in which temperature-degradable materials are not involved, higher substrate temperatures can be used.

Another embodiment of the present invention uses one or more magnetic fields during the deposition of the Fe—Cr—N based films to induce magnetic anisotropy in the desired direction. Since the inventive films have soft magnetic properties, a relatively low field is applied to introduce preferential ordering of atoms to form an easy direction of magnetization for higher permeability, lower coercivity, and more square M-H loop shape. The desired magnitude of applied field is in the range of approximately 2–5000 Oe, preferably in the range of approximately 10–500 Oe. Since the preferred deposition temperature for the inventive films is near ambient temperature, the field is applied conveniently by placing one or more electromagnets or permanent magnets near the substrate without fear of solenoid wire insulation damage or loss of magnetism in permanent magnets upon heating toward or above the Curie temperature.

Figure 2A:
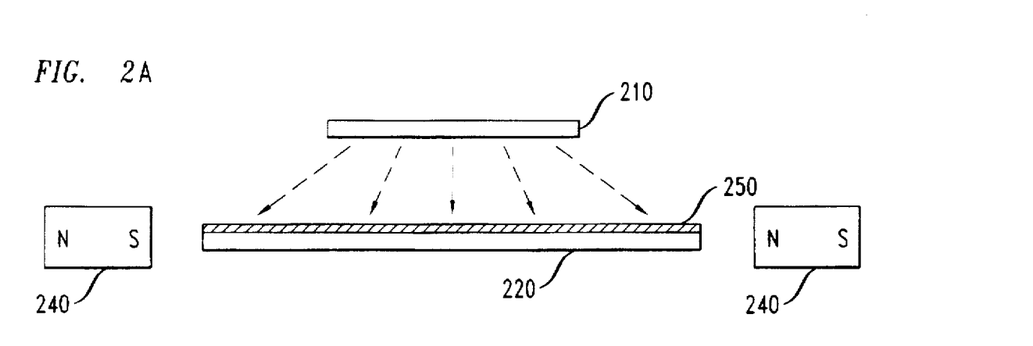
FIGS. 2a–c are schematic diagrams showing a thin film deposition configuration in the presence of applied magnetic field.
Figure 2B:
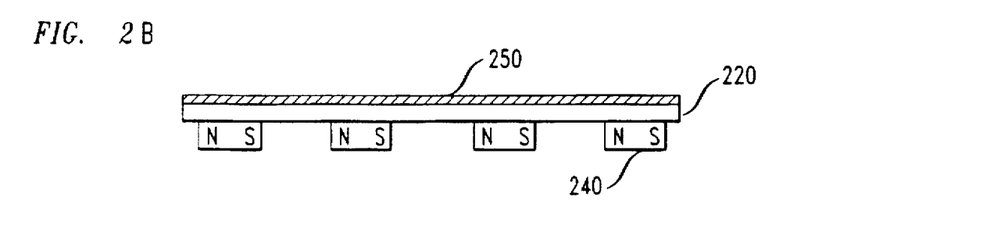
Figure 2C:
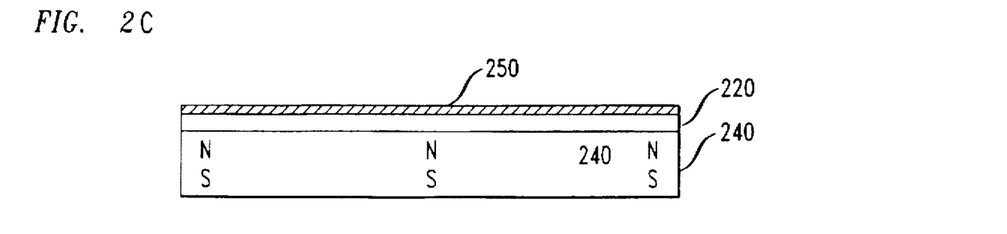

In the case of magnetron sputtering, the stray magnet field itself in the deposition system is used conveniently to induce anisotropy. As shown in FIGS. 2a–c, if an additional field is to be applied, the use of one or more permanent magnets is particularly desirable because of the simplicity of placing magnets either on the sides of or underneath the substrate 220 during the deposition. Various permanent magnets 240 are acceptable, including the high coercivity materials samarium-cobalt (Sm—Co), neodymium-iron-boron (Nd—Fe—B), barium-ferrite and iron-chromium-cobalt (Fe—Cr—Co), which allow self-demagnetization to be reduced in small or short magnet configurations. Multiple magnet arrays, such as shown in FIG. 2(b), provide a stronger field to the substrate regions between the magnets than the case of FIG. 2(a). Also, the magnet arrangement shown in FIG. 2(c) induces vertical anisotropy in the film.

In the case of multilayer deposition, the thickness of the each Fe—Cr—N based layer is typically in the range of approximately 0.001–10.0 microns, preferably in the range of 0.01–2.0 microns. Higher frequency operations generally require thinner magnetic films to reduce eddy current loss. The insulating (dielectric) spacers such as aluminum oxide or polyimide between the magnetic layers are typically in the range of approximately 0.001–1.0 µm. The desired number of magnetic layers depends on the total amount of magnetic flux required and the thickness of each layer, but is typically between 1–1000 layers.

In one embodiment, the composition of the inventive film includes: Fe balance; Cr typically in the range of approximately 0.5–20.0 atomic %, preferably in the range of 1.0–15.0 atomic % and even more preferably in the range of 2.0–10.0 atomic %; Ta in the range of approximately 0.1–10 atomic %, preferably in the range of 0.1–6.0 atomic %, and even more preferably in the range of 0.1–3.0 atomic %; and N in the range of approximately 1.0–30 atomic %, preferably in the range of 2.0–20.0 atomic %, even more preferably in the range of 2.0–15.0 atomic %. Also, other metallic elements such as transition metals, e.g., manganese (Mn), copper (Cu), nickel (Ni), and cobalt (Co), rare earth metals, e.g., cerium (Ce), yitrium (Y) and lanthanum (La), or other elements, e.g., carbon (C), aluminum (Al) and silicon (Si), may be present as impurities in a total amount less than approximately 2 atomic %, preferably less than approximately 0.5 atomic %.

In another embodiment, the composition of the inventive film includes: Fe balance; Cr typically in the range of approximately 0.5–20.0 atomic %, preferably in the range of 1.0–15.0 atomic % and even more preferably in the range of 2.0–10.0 atomic %; N in the range of approximately 1.0–30.0 atomic %, preferably in the range of 2.0–20.0 atomic %, even more preferably in the range of 2.0–15.0 atomic %; and the remaining element, chosen from Ti, Zr, Hf, V, Mo, Nb or W, in the range of approximately 0.1–10 atomic %, preferably in the range of 0.1–6.0 atomic %, and even more preferably in the range of 0.1–3.0 atomic %. Also, other metallic elements such as transition metals, e.g., nickel (Ni), and cobalt (Co), rare earth metals, e.g., cerium (Ce), yitrium (Y) and lanthanum (La), or other elements, e.g., carbon (C), aluminum (Al) and silicon (Si), may be present as impurities in a total amount less than approximately 2 atomic %, preferably less than approximately 0.5 atomic %.

Structurally, the inventive film includes a nanocrystalline structure with the average crystallite size (grain-size) of less than approximately 1000 Å, preferably less than approximately 500 Å, and even more preferably less than approximately 200 Å. Also, the inventive film exhibits excellent soft magnetic properties in the as-deposited condition without having to go through post-deposition heat treatment. The coercivity ($H_c$) is typically less than approximately 5 Oe, preferably below approximately 2 Oe, and the saturation ($4\pi M_s$) is typically greater than approximately 10 kG, preferably greater than approximately 15 kG, and even more preferably greater than approximately 18 kG. Some of the processing and properties of the inventive films are described in the examples given below.

EXAMPLE 1

Thin films of the Fe—Cr—Ta—N alloy were deposited on 4 inch diameter (100) Si substrates by triode DC magnetron sputtering using a co-sputtering process with two 2.25 inch diameter targets of Fe-5.3% Cr (in atomic %) and pure Ta, or Fe-8.5% Cr and Ta, and using a reactive process in a nitrogen-containing atmosphere. The sputtering chamber was first pumped down to $2\times10^{-7}$ Torr, and then the reactive sputtering was carried out under gas atmosphere with $Ar+N_2$ initial pressure of about $5\times10^{-3}$ Torr, and the gas flow rate of 50 cubic centimeters per minute. The amount of nitrogen in the argon gas was either 0, 2%, 3.5% or 5% in volume. A bias voltage of 140V was applied to the Fe—Cr target and 60V for the Ta target. The Si substrate was kept at ambient temperature during sputtering. The rate of sputter deposited was approximately 15 Å/minute. The films were 1000–2000 Å thick.

Figure 3A:
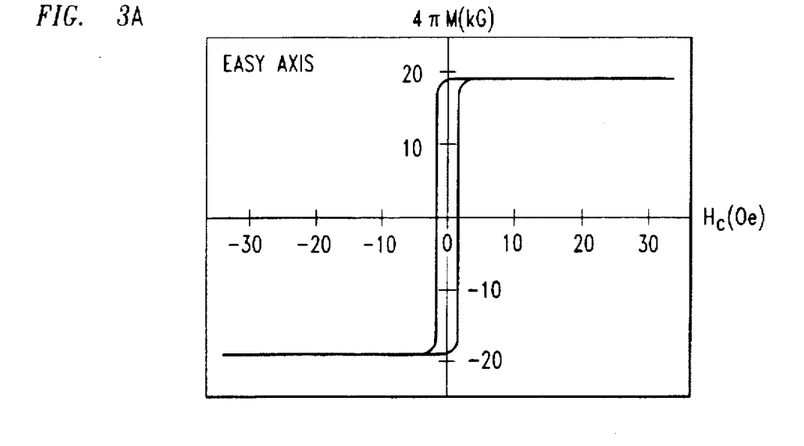
FIG. 3a is a magnetic hysteresis (M-H) loop of an as-deposited Fe—Cr—Ta—N alloy film (approximately 1500 Å thick) along the easy direction of magnetization according to one embodiment of the invention.

The M-H loops were measured by using a Vibrating Sample Magnetomer (VSM) in conjunction with a Helmholtz magnetizing coil. The loops were measured as a function of in-plane orientation to determine the direction of easy and hard magnetization. Because of the co-sputtering process from the two targets placed approximately 6 inches apart, the deposited Fe—Cr—Ta—N films had a concentration gradient from one end to another, i.e., the Fe—Cr rich end and the Ta rich end. Small samples, each approximately 0.125 inch square, were cut from various locations of the substrate to represent a spectrum of the gradient composition. The easy axis M-H loop of the films in this example is shown in FIG. 3a. Table 1 shows the magnetic properties of some samples. The approximate compositions were determined by Rutherforedd backscattering analysis.

TABLE 1

| Magnetic Properties of Fe—Cr—Ta—N Films in the As—Deposited Condition | | |
|---|---|---|
| Composition (Atomic %) | $4\pi M_s$ (k-Gauss) | $H_c$ (Oersted) |
| Fe-4.4% Cr-0.8% Ta-6.9% N | 17.2 | 1.5 |
| Fe-4.6% Cr-0.2% Ta-7.4% N | 19.7 | 1.2 |
| Fe-6.5% Cr-3.2% Ta-16.1% N* | 16.7 | 1.5 |

*Obtained by co-sputtering from Fe-8.5% Cr and Ta targets.

EXAMPLE 2

Thin films of the Fe—Cr—Hf—N alloy were deposited on 4 inch diameter (100) Si substrates by triode DC magnetron sputtering using a co-sputtering process with two 2.25 inch diameter targets of Fe-5.3% Cr (in atomic %) and pure Hf, or Fe-8.5% Cr and Hf, and using a reactive process in a nitrogen-containing atmosphere. The sputtering chamber was first pumped down to $2\times10^{-7}$ Torr, and then the reactive sputtering was carried out under gas atmosphere with Ar+N$_2$ initial pressure of about 5×10$^{-3}$ Torr, and the gas flow rate of 50 standard cubic centimeters per minute. The amount of nitrogen in the argon gas was either 0, 2%, 3.5% or 5% in volume. A bias voltage of 140V was applied to the Fe—Cr target and 60V for the Hf target. The Si substrate was kept at ambient temperature during sputtering. The rate of sputter deposited was about 15 Å/minute. The films were 1000–2000 Å thick.

Figure 3B:
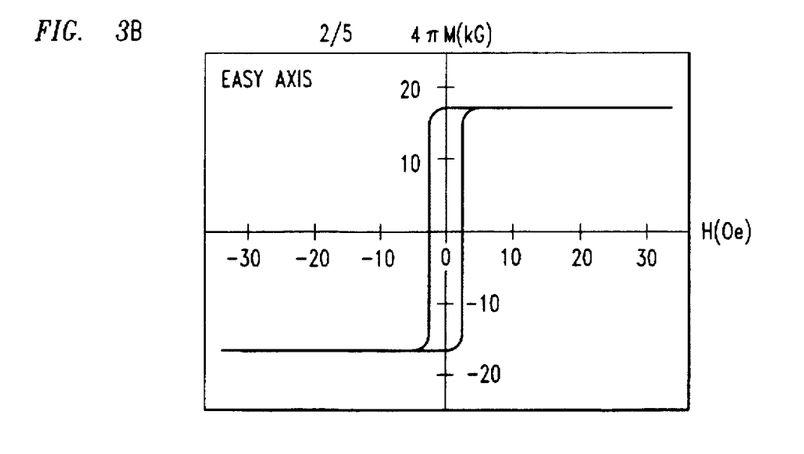
FIG. 3b is a magnetic hysteresis (M-H) loop of an as-deposited Fe—Cr—Hf—N alloy film (approximately 1000 Å thick) along the easy direction of magnetization according to another embodiment of the invention.
Figure 3C:
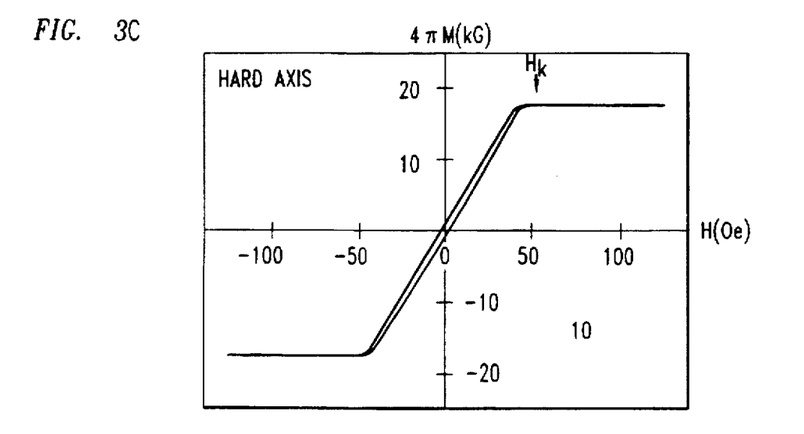
FIG. 3c is a magnetic hysteresis (M-H) loop of the as-deposited Fe—Cr—Ta—N alloy film (approximately 1500 Å thick) shown in FIG. 3a along the hard direction of magnetization.

The M-H loops were measured by using a Vibrating Sample Magnetomer (VSM) in conjunction with Helmholtz magnetizing coil. The loops were measured as a function of in-plane orientation in order to determine the direction of easy and hard magnetization. Because of the co-sputtering process from the two targets placed approximately 6 inches apart, the deposited Fe—Cr—Hf—N films have a concentration gradient from one end to another, i.e., the Fe—Cr rich end and the Hf rich end. Small samples, each about 0.125 inch square, were cut from various locations of the substrate to represent a spectrum of the gradient composition. A sample with an approximate composition of Fe-4.3 atomic % Cr-0.3% Hf-5.3% N and a thickness of approximately 1000 Å gave the following magnetic properties: 4πM$_2$=17.2 kG and H$_c$=1.8 Oe. Also, see FIG. 3$b$.

As is evident from Examples 1 and 2, excellent soft magnetic properties are obtained in the as-deposited condition of the inventive films of both embodiments. Such combinations of high 4πM$_s$ and low coercivity are very attractive for use in many electromagnetic devices, such as microtransformers and recording heads. The easy axis M-H loop of the films are shown in FIGS. 3$a$–$b$. The square nature of the M-H loops are evident.

Figure 4:
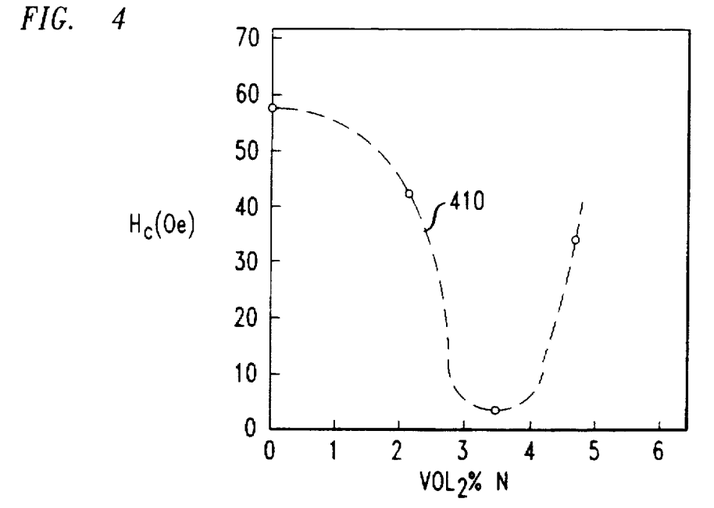
FIG. 4 is a plot of magnetic coercivity in the inventive Fe—Cr—Ta—N alloy films vs. nitrogen content in an argon (Ar) carrier gas during the reactive sputtering process.

Shown in FIG. 4 is a plot 410 of magnetic coercivity of the inventive Fe—Cr—Ta—N films vs. nitrogen content (in volume %) in the Ar gas sputtering atmosphere. In general, nitrogen content in the Fe—Cr—Ta—N films increases with the volume % of the nitrogen (N$_2$) gas in the sputtering atmosphere.

The amount of nitrogen in the inventive alloy films is critical in determining the soft magnetic properties. The H$_c$ value of the inventive alloy films depend on the nitrogen content, with the lowest coercivity being obtained by sputtering at a nitrogen gas content of 3.5 volume %. Too low a nitrogen content is ineffective for preventing grain growth of an iron matrix and results in a high H$_c$. Too high a nitrogen content reduces the saturation magnetization and also raises the H$_c$. Thus, in order to achieve low H$_c$, there appears to be an optimal range of nitrogen content for a given alloy composition.

The addition of Cr to a Fe—x—N alloy film (where x is Ta or at least one of the elements Ti, Zr, Hf, V, Mo, Nb or W) makes it possible to achieve improved soft magnetic properties (low H$_c$ and square M-H loop) in the as-deposited condition, and eliminates the need for post-deposition heat-treatment. The exact reason why Cr induces such characteristics is not understood at the moment, but it could be related possibly to the ease of formation of a desirable nanocrystalline microstructure or the reduction of undesirable magnetostriction in the as-deposited films.

Figure 5:
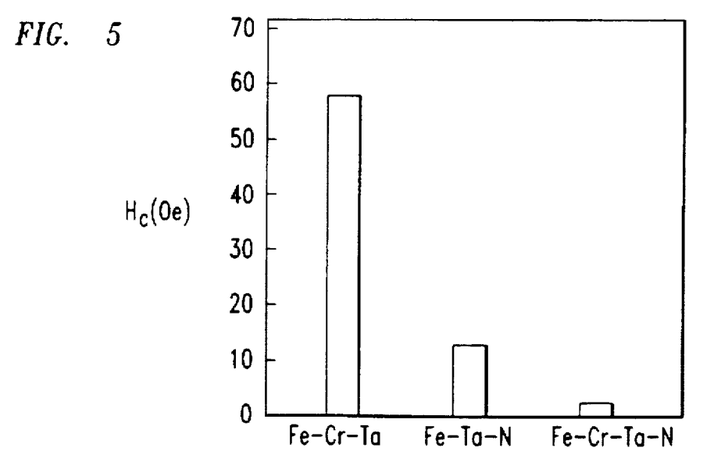
FIG. 5 is a diagram showing the comparative magnetic softness ($H_c$) of the Fe—Cr—Ta, Fe—Ta—N and Fe—Cr—Ta—N films in the as-deposited condition.

Shown in FIG. 5 is a diagram comparing the magnetic softness in terms of H$_c$ in the as-deposited condition of Fe—Cr—Ta, Fe—Ta—N and Fe—Cr—Ta—N films having comparable compositions of alloying elements (if present, approximately 5% Cr, approximately 1% Ta, approximately 7% N and balance Fe) and comparable saturation moments. As shown in FIG. 5, the addition of Cr to Fe—Ta—N, as well as the addition of N to Fe—Cr—Ta, significantly improves the soft magnetic properties.

Also, because of the presence of Cr, the inventive films exhibit substantially improved (at least 30%) resistance to corrosion/oxidation as compared to the prior art soft magnetic films without Cr. For example, films approximately 1000 Å thick and having a composition of Fe-6.3% Cr-3.2% Ta-16.1% N on a Si substrate were kept in tap water or 50% nitric acid for 30 minutes. There was no noticeable corrosion or dissolution of the thin film material in either case. Also, there was no discoloration or decrease in film thickness, and there was no measurable change in total magnetic moment. Furthermore, the H$_c$ and the "squareness" of the M-H loop also did not change. The resistance to oxidation is important in maintaining the soft magnetic properties during actual device usage, as the oxidation of Fe-rich alloys causes changes toward lower 4πM$_s$, higher coercivity and inferior permeability.

In an alternative embodiment, the inventive films are given an optional low-temperature heat treatment, if desired, to further improve the soft magnetic properties. In order to reduce the damage to insulating layers such as polyimide, low heat treating temperatures below approximately 150° C are used. In order to minimize surface oxidation during the heat treatment, a high vacuum atmosphere (e.g., better than approximately 10$^{-4}$ Torr) is used. A lower vacuum is used if the top surface of the film of film layers is protected, e.g., by oxidation-resistant coatings such as Cr, Al, oxide, or nitride films.

For example, in an earlier discussed example, an as-deposited film composition of Fe-4% Cr-1.1% Ta-6% N was approximately 1500 Å and exhibited a 4πM$_s$ of approximately 15.1 kG and a H$_c$ of approximately 1.1 Oe. Once, the film was heat treated at 125° C. for approximately 3 hours in a vacuum of 10$^{-4}$ Torr, the resultant film exhibited an improved 4πM$_s$ of approximately 20.2 kG and a H$_c$ of approximately 0.9 Oe.

In an alternative embodiment of the invention, the film is formed as a composite structure with a different type of magnetic layer. For example, the composite structure has one or more exchange bias films, which are antiferromagnetic, ferromagnetic or ferrimagnetic, added directly on the soft magnetic film surface. Specifically, a thin film of Fe-50% manganese antiferromagnetic alloy is added onto some or all of the Fe—Cr—N based soft magnetic layers to shift the M-H loop (by more than the H$_c$ of the soft magnetic film, e.g., by at least 2 Oe) and to allow high frequency operation of the soft magnetic films in the internal bias-field mode with minimal magnetic domain wall motion.

The last step 140 in FIG. 1 is to assemble the magnetic thin film within electromagnetic devices such as microtransformers, inductors and recording heads. Step 140 comprises cutting up the substrate (containing a deposited and optionally patterned single layer, multilayer or composite-structured magnetic film) into a desirable size, adding appropriate interconnection and conductor circuitry if needed, and assembling within the desired electromagnetic devices.

Figure 6:
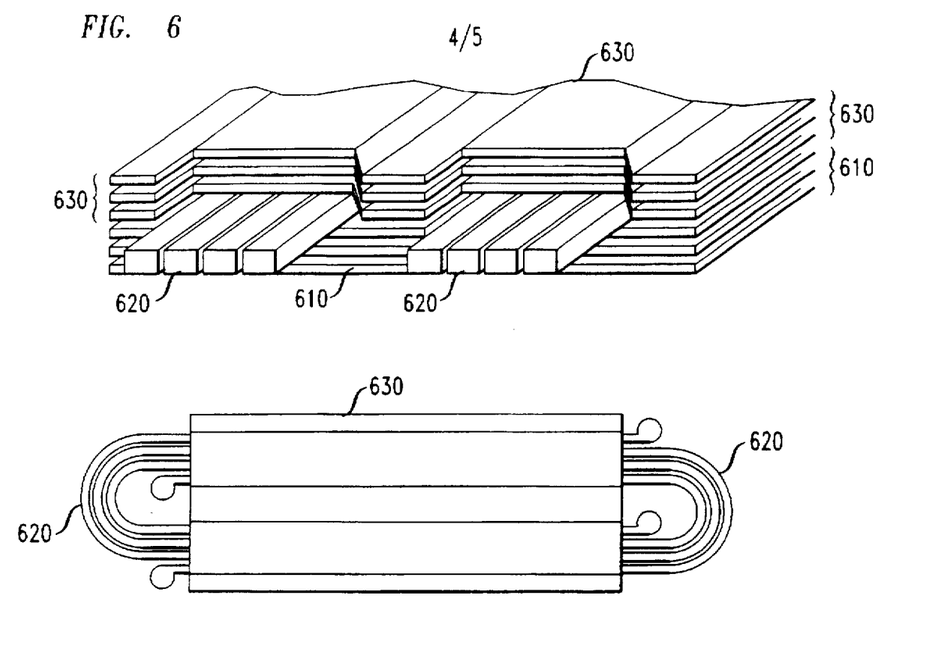
FIG. 6 is a schematic diagrams showing the structure of a pot-core type microtransformer comprising the inventive Fe—Cr—N based films.

Shown in FIGS. 6$a$–$b$ are schematic diagrams illustrating a pot-core type microtransformer design comprising the inventive Fe—Cr—N based films. In this design, the multiplicity of soft magnetic film layers 610 (laminations with polyimide or other insulating layers therebetween) are first deposited, a patterned conductor layer 620 (e.g., containing Cu lines) is added above magnetic film layers 610, and then more magnetic film laminations 630 are deposited, as shown.

Figure 7:
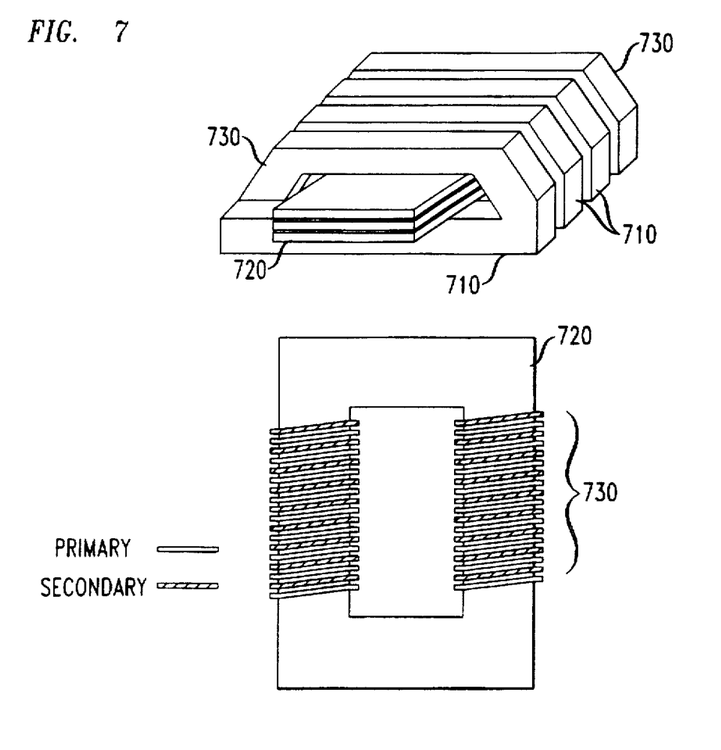
FIG. 7 is a schematic diagram showing the structure of a toroid type microtransformer comprising the inventive Fe—Cr—N based films.

Shown in FIGS. 7$a$–$b$ are schematic diagrams illustrating a toroidal microtransformer design. Here, a conductor layer 710 in the form of parallel segments is prepared first, then a Fe—Cr—N based magnetic film lamination 720 is deposited thereon, and then a top conductor layer 730 in the form of parallel segments is added to be connected with segments of conductor layer 710 to form a toroidal winding configuration.

For certain applications, the Fe—Cr—N based films are deposited in such a way that the easy axis of magnetization coincides with the direction of applied field from the windings. For very high-frequency applications (e.g., approximately 10 MHz or greater), magnetization switching by domain wall motion is not desirable and hence the magnetically hard direction is used so that coherent spin rotation mode is operational.

For this reason, in-plane uniaxial magnetic anisotropy and the accompanying square M-H loop shape is desirable. The uniaxial anisotropy, which is induced, e.g., by thin film deposition in the presence of magnetic fields, can be defined in terms of an anisotropy field, $H_k$, which is represented by the field in which the hard axis magnetization loop reaches saturation. See, for example, FIG. 3c.

Desirable $H_k$ values in the inventive films are, e.g., in the range from 10–100 Oe and preferably in the range from 20–50 Oe. Too high of a $H_k$ value reduces the high frequency permeability (which is proportional to $4\pi M/H_k$ in the hard axis operation). Too low of a $H_k$ value causes the ferromagnetic resonance frequency to be reduced and interfere with operating frequency ranges. Therefore, too much magnetic softness (i.e., a very low $H_k$ value) is undesirable for high frequency devices of this invention.

The "squareness" of the M-H loop in the easy axis direction is desirable, as the film first can be saturated essentially into a single domain state along the easy axis, and then operated in a high frequency alternating current (AC) mode in the hard axis direction to minimize the domain wall motion. The inventive Fe—Cr—N based films have a "squareness", as defined by the ratio of the remanent magnetization (i.e., M at H=0) to the saturation magnetization, of at least 0.90 and preferably at least 0.95.

Figure 8A:
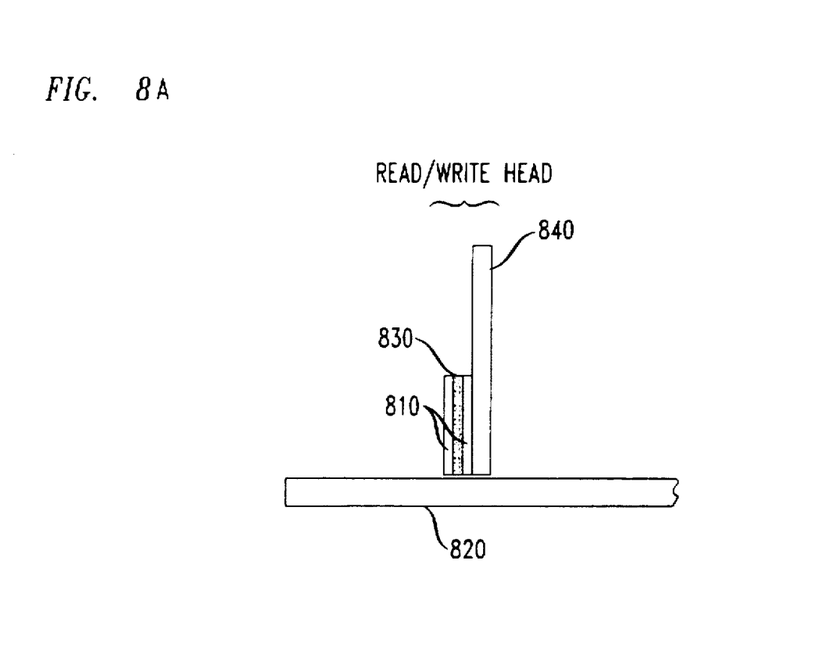
FIGS. 8a–b are schematic diagrams showing the structure of a magnetic recording head comprising the inventive Fe—Cr—N based films.
Figure 8B:
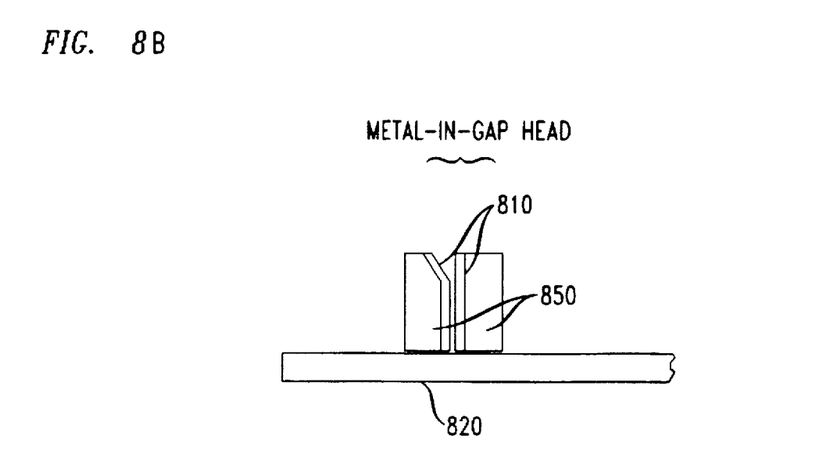

FIGS. 8a–b show embodiments of the invention incorporated into electromagnetic devices. A cross-sectional view of a recording read-write head comprising an embodiment of the inventive film is illustrated in FIG. 8a. The soft magnetic film 810 serves to amplify the magnetic signal from the recorded magnetic memory bit information in the magnetic disk or tape 820 so that the inductive sense coil or magnetoresistive sensor 830 can generate a higher output signal. Shown also is the substrate 840.

Alternatively, as shown in FIG. 8b, the inventive film is used as the high-magnetization material in the metal-in-gap (MIG) type head configuration. In this embodiment, the head 850 is made of, e.g., ferrite.

It will be apparent to those skilled in the art that many changes and substitutions can be made to the thin films and their incorporation into the electromagnetic devices herein described without departing from the spirit and scope of the invention as defined by the appended claims.

The invention claimed is:

1. An article, comprising:

a non-magnetic substrate; and a magnetically soft film supported by said substrate, said magnetically soft film including an alloy of iron-chromium-tantalum-nitrogen (Fe—Cr—Ta—N) and having an anisotropy field, $H_k$, within the range from approximately 10 to approximately 100 oersteds (Oe), wherein said alloy contains, by atomic percentage, Cr in the range from approximately 0.5% to 20%, Ta in the range from approximately 0.1% to 10%, N in the range from approximately 1% to 30%, the balance consisting essentially of Fe, with elements other than Fe, Cr, Ta and N being at most approximately 2% wherein a total, by weight percentage of Fe, Cr, Ta and N equals approximately 100%, wherein said article has been heat treated at a temperature of no more than approximately 150° C.

2. The article as recited in claim 1, wherein said alloy has a composition selected to provide the alloy a coercivity, $H_c$, of less than approximately 5.0 oersteds, and a remanent magnetization to saturation magnetization ratio of at least 0.90.

3. The article as recited in claim 1, wherein said magnetically soft film further comprises a plurality of thin film layers and wherein said article further comprises a corresponding plurality of dielectric spacer layers formed between said thin film layers in such a way that a multilayer structure is formed.

4. The article as recited in claim 3, wherein said plurality of dielectric spacer layers further comprises polyimide layers.

5. The article as recited in claim 1, wherein said magnetically soft film is formed on said substrate in such a way that the average grain structure size of said magnetically soft film is less than approximately 500 Å.

6. The article as recited in claim 1, further comprising one or more exchange bias films formed on said magnetically soft film, said exchange bias films selected from a group consisting of antiferromagnetic, ferromagnetic and ferrimagnetic material.

7. The article as recited in claim 1, wherein said article is part of an electromagnetic device selected from a group consisting of a microtransformer, an inductor and a magnetic read-write head.

8. The article as recited in claim 1, wherein said article is for use at an operating frequency of at least approximately 10 MHz, and wherein said article is saturated along an easy axis of magnetization into a single domain state and then operated in an alternating current (AC) field along a hard axis of magnetization.

* * * * *